G. CRAINE & J. W. BLOSS.
Elevated Oven-Attachments for Stoves.
No. 142,558. Patented September 9, 1873.
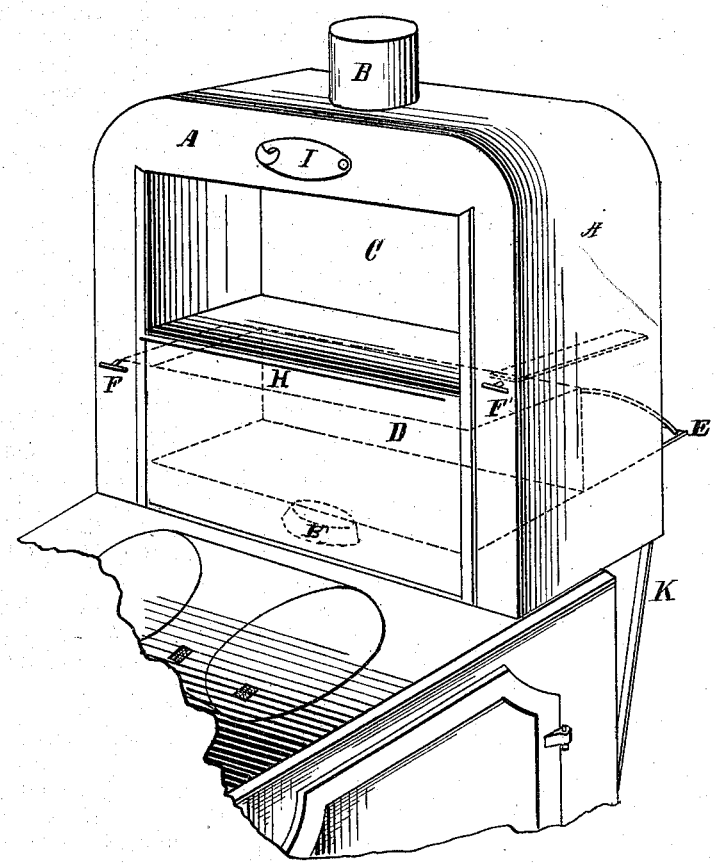
Witnesses
Inventor.

UNITED STATES PATENT OFFICE.

GEORGE CRAINE AND JOHN W. BLOSS, OF FAIRFIELD, IOWA.

IMPROVEMENT IN ELEVATED OVEN ATTACHMENTS FOR STOVES.

Specification forming part of Letters Patent No. 142,558, dated September 9, 1873; application filed February 1, 1873.

*To all whom it may concern:*

Be it known that we, GEORGE CRAINE and JOHN W. BLOSS, of Fairfield, in the county of Jefferson and State of Iowa, have invented certain new and useful Improvements in Supplemental or Elevated Ovens for Stoves; and do hereby declare that the following is a full, clear, and exact description of the same, reference being had to the accompanying drawing making a part of this specification, in which is shown in perspective our improved device as applied to a stove.

The design of our invention is to increase the capacity of an ordinary cooking-stove for baking, roasting, &c.; and it consists in the peculiar construction of our oven, substantially as and for the purpose hereinafter specified.

In the annexed drawing, A represents the external casing of our oven, having preferably a rectangular form, and provided within its upper and lower sides with suitable thimbles B and B', respectively, for receiving the stove-pipe and for embracing the pipe-collar of a stove. Within the front side and above the center of the casing A is a compartment, C, open to the front, and having such dimensions as to leave a considerable space between its ends, back, and top sides, and the contiguous portions of said casing. A second compartment, D, is formed within the lower portion of the casing A and made open to the rear, the relative dimensions of said compartment being such as to leave upon all sides, except said rear, a space, through which the heated escaping products of combustion may circulate during their passage through the oven. A hinged door, E, incloses the open side of the rear lower compartment D, while a vertically-sliding door, H, enables the front upper compartment to be inclosed when desired. A damper, F, placed between one end of the lower compartment D and the contiguous end of the casing A, and a similar damper, F', placed in a like position at the opposite end of the upper compartment C, enable the course of the heated gases to be changed, so as to cause said gases to pass entirely around said compartment D, whenever it is desired to heat the same for the purpose of baking. At other times, or when the oven is used for the purpose of warming food, the dampers are to be left open, and the heated gases permitted to take their usual direct course upward. A damper, I, pivoted at one end to or upon the front side and upper portion of the casing A, swings edgewise away from or over a corresponding opening, and furnishes a means whereby air may be admitted to the flues of the oven for the purpose of lessening the draft and of carrying off the odors and vapors, given off from food while being cooked upon the stove.

The device thus constructed is simple, cheap, and efficient, can be applied to any stove, and when so applied materially increases the capacity of the same.

Having thus fully set forth the nature and merits of our invention, what we claim as new is—

The hereinbefore-described supplemental oven, consisting of the external casing A, the compartments C and D, the doors E and H, and the dampers F, F', and I, substantially as and for the purpose specified.

GEORGE CRAINE.
JOHN W. BLOSS.

Witnesses:
J. M. SHAFFER,
JOHN A. SPIELMAN.